F. A. LEE AND F. G. ROSE.
PHONOGRAPH.
APPLICATION FILED DEC. 26, 1917.

1,413,919.

Patented Apr. 25, 1922.

Witnesses:

Inventors
Frank A. Lee
Frank G. Rose
By James N. Ramsey
Attorney.

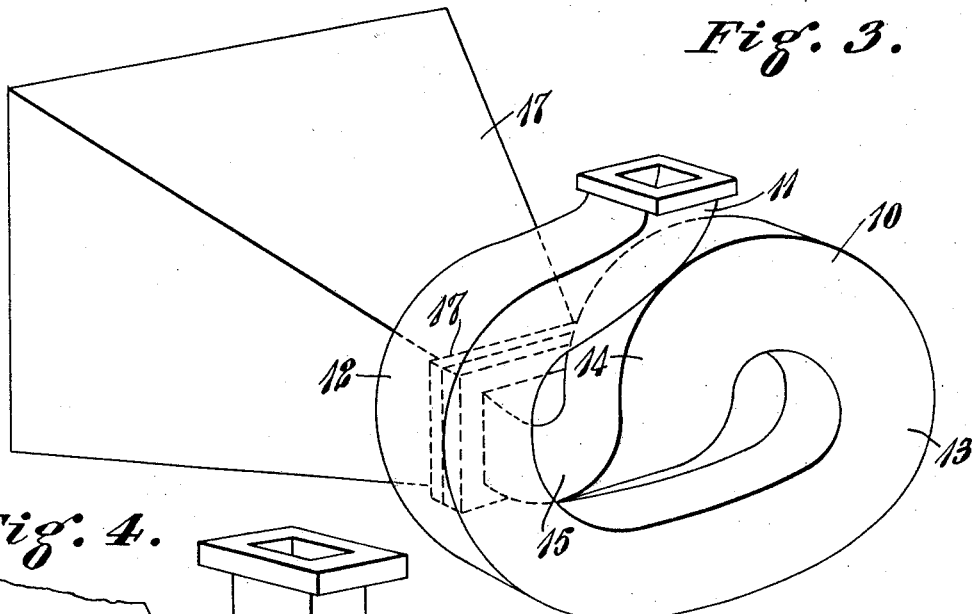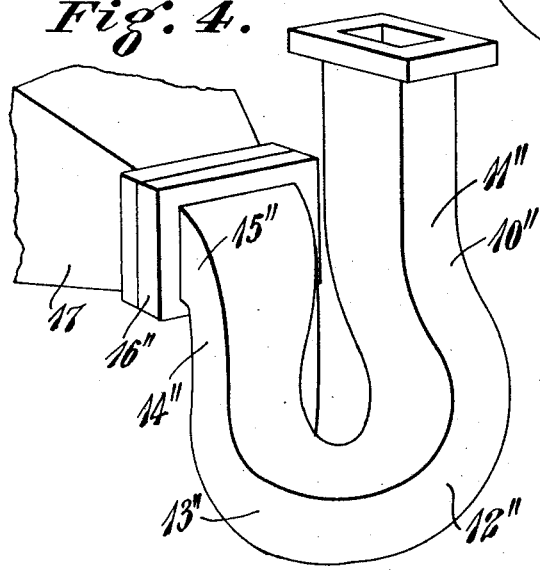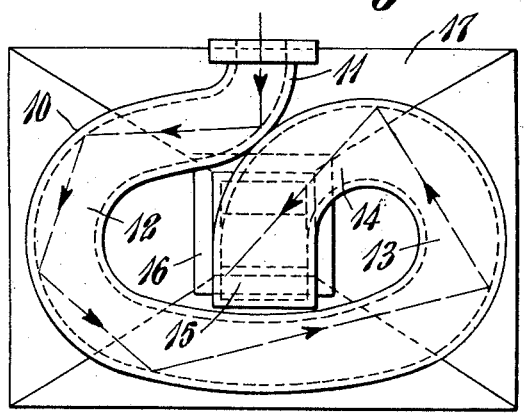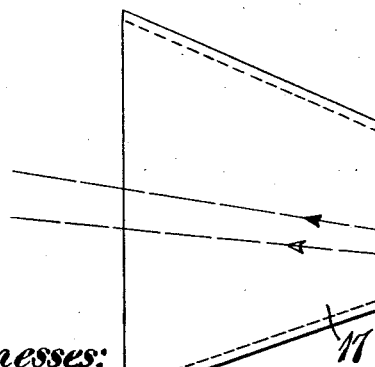

UNITED STATES PATENT OFFICE.

FRANK A. LEE, OF CINCINNATI, OHIO, AND FRANK G. ROSE, OF DAYTON, KENTUCKY, ASSIGNORS TO THE JOHN CHURCH COMPANY, OF CINCINNATI, OHIO, A CORPORATION OF OHIO.

PHONOGRAPH.

1,413,919.      Specification of Letters Patent.      Patented Apr. 25, 1922.

Application filed December 26, 1917. Serial No. 208,831.

*To all whom it may concern:*

Be it known that we, FRANK A. LEE and FRANK G. ROSE, citizens of the United States, and residents of Cincinnati, in the county of Hamilton and State of Ohio, and Dayton, in the county of Campbell and State of Kentucky, respectively, have invented certain new and useful Improvements in Phonographs, of which the following is a specification.

Our invention relates to megaphones for phonographs or graphophones.

The object of our invention is to so influence the sound waves produced by the phonograph that said waves are amplified, intensified, made richer in quality and clarified, so as to reproduce more nearly the actual quality of the sound-waves imparted from the phonograph record to the phonograph diaphragm.

Our invention consists in the combination of parts and in the details of construction and arrangement of parts as will hereinafter be more fully described and claimed.

In the drawings:

Fig. 3 is a detail perspective view of the megaphone and throat shown in Fig. 1; but the view being from the rear;

Fig. 4 is a similar view of part of the megaphone and another modified throat according to our invention;

Fig. 5 is a rear elevation of the megaphone and throat shown in Figs. 1 and 3; and Fig. 6 is a side elevation of the same.

Figure 1:
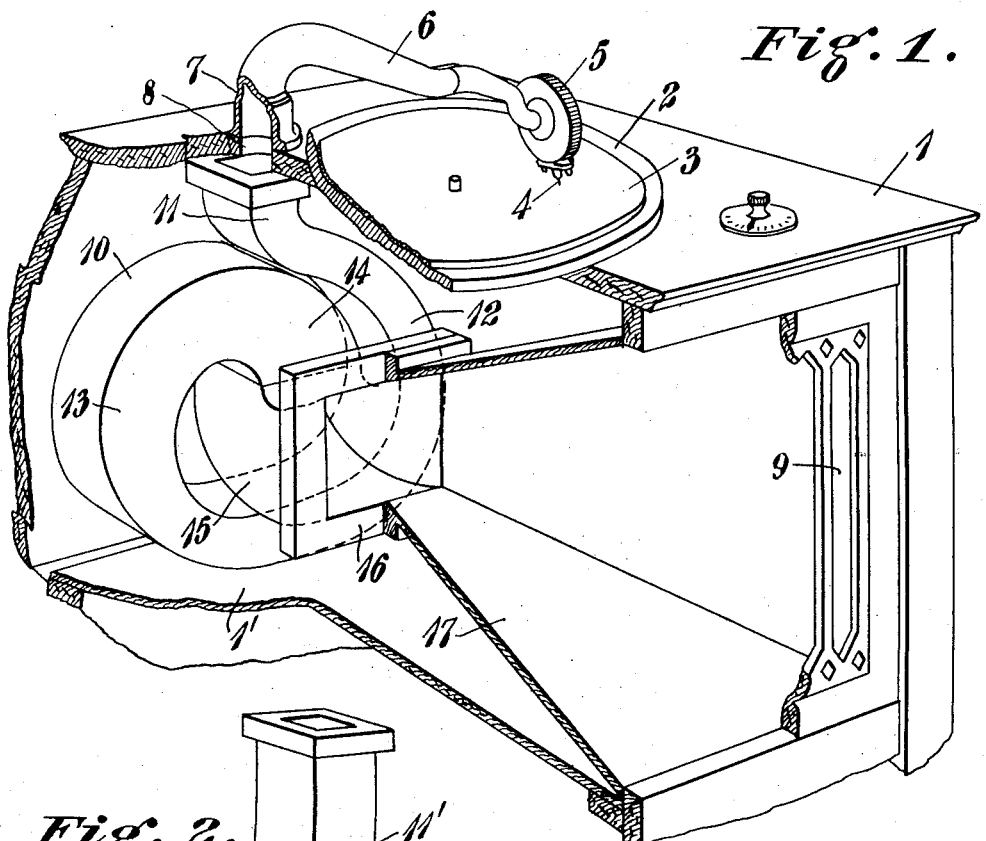
Fig. 1 is a sectional perspective view of part of a phonograph in which our invention is embodied in its preferred form.

As we prefer to construct our invention, and as illustrated in Figs. 1, 3, 5 and 6, the casing 1 (Fig. 1) of usual construction, carries on its top the turn-table 2 with the record 3 thereon, receiving the stylus 4 carried in suitable means on the sound-box 5, which is mounted on the sound arm 6, which is fixed on the top of the base 1 by a suitable pedestal 7 at the rear of the turn-table, and being hollow and gradually increasing in interior area down to the opening 8 through the top of the base 1 under the pedestal 7. All of this construction is well known, and it is only necessary to refer to it to mention that the sound-waves travel from the diaphragm in the sound-box 5 backward and downward through this hollow sound-arm 6 and its hollow pedestal 7 and aperture 8, where, as in phonographs of usual construction, these waves pass downward into a downwardly and forwardly curving throat of gradually increasing diameter into the horn or megaphone from which waves emerge at the front side of the casing 1, generally through a suitably apertured door 9, only part of which is shown in Fig. 1.

However, we provide an improved throat 10, which, being provided with a suitable junction with the under side of the top of the casing 1 and communicating with the interior of the sound-arm in the pedestal and aperture 8, curves downwardly and to the right (supposing one to be facing the apparatus,) this first curve 11 being comparatively abrupt, and then continues to the right and downwardly and to the left in a much less abrupt curve 12 passing close along the bottom 1' of the upper compartment of the casing 1, then to the left and upward and to the right again in another large curve 13, passing close under the first curve 11 and then downward approximately in the center of the apparatus in a curve 14 and then curving downwardly and forwardly and slightly upwardly in a final curve 15 where the throat has a suitable connecting means 16 by which it forms junction with the rear end of the megaphone 17, which is substantially the frustum of a pyramid, thin walled with hollow interior, communicating with the throat, as do the megaphones with the usual throats in usual phonographs, and opening at the front of the casing 1 preferably through the apertures in an apertured door such as the door 9.

This throat, in addition to having the successive curves described, is preferably of constantly increasing interior area from its beginning to its end.

It is preferable to construct this throat of wood; and, furthermore, we prefer to saw the curved walls out of solid blocks of wood, rather than to resort to a steaming and bending process which distorts the natural fibers of the wood and impairs its vibrating properties, so useful in improving the musical sounds of the apparatus.

Figure 2:
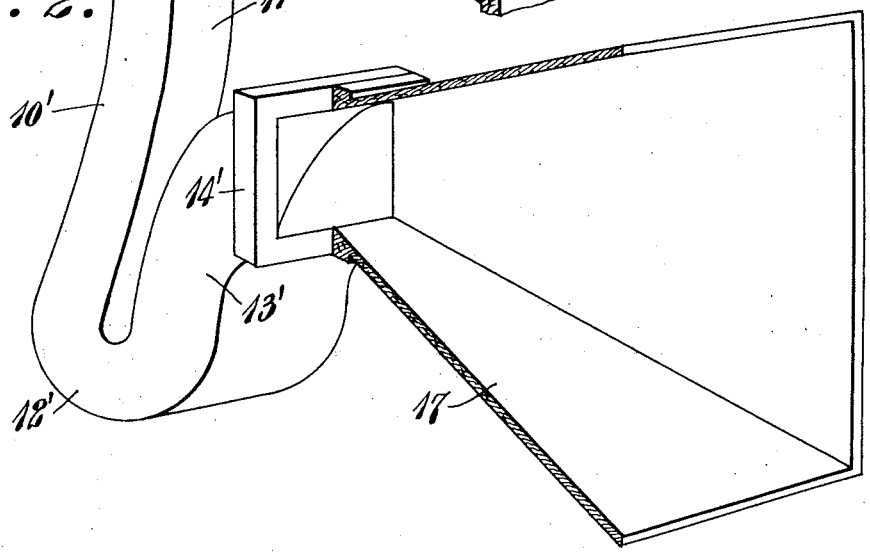
Fig. 2 is a detail perspective view of the megaphone of a phonograph, together with a throat according to our invention, but modified from that shown in Fig. 1, the megaphone being shown in longitudinal section.

In the modification shown in Fig. 2, the throat 10' has its upper end adapted for communication with the interior of the sound-arm 6, as in Fig. 1, but merely extends downwardly and slightly curves to the rear in a curve 11', and then where it would be close to the bottom 1' of the casing compartment, curves abruptly forwardly and upwardly in a curve 12' and then in a less abrupt curve 13' curves upwardly and forwardly where it has suitable means 14' to join it to the megaphone 17 of the kind shown in the preceding example.

It will be understood that this modified throat and the megaphone will be mounted in the phonograph as shown in Fig. 1.

In the additional modification shown in Fig. 4, the throat 10'' extends downwardly and slightly to the left (facing the apparatus) in a curve 11'', then more abruptly downwardly and to the right in a curve 12'', then around to the front in a curve 13'' lying approximately in a horizontal plane, then forwardly and upwardly in a curve 14'', and then upwardly and forwardly in a final curve 15'', terminating in suitable means 16'' to connect it to the magaphone 17, as in the preceding examples.

It will be seen that the examples of Figs. 2 and 4 provide for a throat of much less length than that shown in the other example of Figs. 1, 3, 5 and 6. The throats 10' and 10'' of Figs. 2 and 4, respectively, are approximately twice the length of the usual phonograph throat with its single bend downwardly and forwardly to the megaphone; whereas the throat 10 of the other example is over four times as long as the usual phonograph throat. The throat 10'' of Fig. 4 is slightly longer than the throat 10' of Fig. 2; but an objectionable feature of this throat 10'' is the terminal curve 15'' entering the megaphone 17 from the right, which has a tendency to throw the sound-waves to one side of the megaphone, thus causing an uneven distribution of the waves.

Also, in both of these modifications, a considerable proportion of the throat follows approximately a straight line; and one of the objects of our invention is to have as many curves as possible, for reasons which will be more fully pointed out. But these modifications are shown as illustrations of what may be included within the terms of our patent, even though in some respects inferior to our preferred construction, as exemplified in Figs. 1, 3, 5 and 6.

As indicated by the broken lines and arrow-heads in Figs. 5 and 6, a sound wave will be deflected by the lower inner side of the first curve 11 of the throat 10, then several times around the larger curve 12 into the curves 13 and 14, and then will be deflected by the inside of the bottom of the terminal curve 15 upwardly and outwardly through the megaphone 17. As will be noted in Fig. 6, the decided upward curvature of this terminal curve 15 results in an additional deflection of the sound-wave, as indicated by the broken lines and light arrow-heads; and the result of this detail is to cause a larger proportion of the sound waves to be directed somewhat upwardly out through the megaphone, as is generally desirable, because the ears of the hearers are somewhat higher than the mouth of the megaphone. This upward direction of the terminal curve is also provided in the modifications, as the terminal curve 13' in Fig. 2, or the terminal curve 15'' in Fig. 4.

It will be seen from the foregoing description, together with an inspection of the drawings, especially Figs. 5 and 6, that one of the results of our invention is to deflect the sound-waves after they reach the throat from the diaphragm and sound-arm of the phonograph at varying angles from one side to the other of the throat throughout its various curves. It being understood that these sound-waves are in great number and with greatly varying initial directions, as produced by the diaphragm while vibrating in various positions due to one vibration supervening before another is finished; therefore with this provision these highly numerous and variously directed sound-waves enter the throat in exceedingly rapid succession and are caused by such construction of the throat to cross and recross in complex form, which is, of course, not adequately represented by a mere tracing of the path of one or two waves, as in Figs. 5 and 6.

It is found in practice, with the use of our invention, that through such method of travel of the sound-waves through the improved throat, the waves are not only amplified and intensified, but are made richer in quality and are greatly clarified, with the result that they reproduce with greater fidelity than we have heretofore known, the actual quality of the sounds as they were originally produced, and as they are, of course, expected to be reproduced by a phonograph. We have found in practice that our improved phonograph, as herein described, is capable, for instance, of rendering a satisfactory reproduction of piano music which has always presented great difficulty of reproduction heretofore.

Moreover, due to this increased clearness thus caused by the complex travel of the sound-waves, as well as to the greater intensity thereby derived, and the consequent greater amplification permitted, the phonograph provided with our invention will, with the usual record and sound-box, and reproducing practically any kind of music or other production, afford a more satisfactory reproduction to a hearer at a considerable distance from the apparatus. We have found in practice that certain notes of a piano selection, reproduced without the aid of our invention, are not clearly distinguished at a distance of more than thirty feet from the apparatus; whereas when the apparatus is provided with our improved throat, the entire rendition is satisfactory to a hearer at a distance of over one hundred feet.

As just mentioned, greater amplification is permissible due to the increased intensity and clarity of the sound-waves; and it will also be understood that on account of the greatly increased length of the throat, especially in the preferred example of Figs. 1, 3, 5 and 6, this amplification is greatly increased over that afforded by the comparatively short throat, as usually provided. This somewhat increased amplification, of course, also makes the apparatus audible at a greater distance, on account of the sound-waves having been made to travel over four times as far as they do in the usual throat.

As shown herein, the cross-section of the throat is approximately square or somewhat oblong; this being more conveniently constructed of wood, preferably spruce. However, it will be understood that the cross-section may be of other shapes; or the throat may be constructed of material other than wood; and that various other minor modifications are within the scope of our invention, which having been fully set forth is defined in the following claim:

A phonograph throat of curved formation and substantially rectangular cross-section, comprising longitudinally curved walls cut from solid blocks of wood, and other substantially flat wooden walls connecting the edges of said curved walls, whereby the natural fibers of the wood in said curved walls have their vibrating qualities unimpaired.

FRANK A. LEE.
FRANK G. ROSE.

Witnesses:
JAMES N. RAMSEY,
HELEN MAIER.